United States Patent
Miyazawa (10) Patent No.: US 8,461,237 B2
(45) Date of Patent: *Jun. 11, 2013

(54) GEL COMPOSITION, METHOD OF PREPARING THE SAME, AND IMPACT RESISTANT ABSORBING MATERIAL USING THE SAME

(75) Inventor: Haruhiko Miyazawa, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 180 days.

This patent is subject to a terminal disclaimer.

(21) Appl. No.: 12/990,510

(22) PCT Filed: Apr. 24, 2009

(86) PCT No.: PCT/US2009/041693
§ 371 (c)(1),
(2), (4) Date: Jan. 12, 2011

(87) PCT Pub. No.: WO2009/134694
PCT Pub. Date: Nov. 5, 2009

(65) Prior Publication Data
US 2011/0097585 A1    Apr. 28, 2011

(30) Foreign Application Priority Data
May 2, 2008   (JP) .................. 2008-120384

(51) Int. Cl.
*C08K 5/521* (2006.01)
*C09D 133/02* (2006.01)
*C09D 133/14* (2006.01)

(52) U.S. Cl.
USPC .......... 524/140; 524/710; 524/556; 524/706; 428/411.1

(58) Field of Classification Search
USPC ............. 524/706, 710, 556, 140; 428/411.1
See application file for complete search history.

(56) References Cited

U.S. PATENT DOCUMENTS

| | | | |
|---|---|---|---|
| 3,575,881 A * | 4/1971 | Atkins et al. | |
| 5,972,539 A * | 10/1999 | Hasegawa et al. | 429/304 |
| 7,019,049 B1 | 3/2006 | Yoo | |
| 7,411,716 B2 * | 8/2008 | Oh et al. | 359/265 |

(Continued)

FOREIGN PATENT DOCUMENTS

| | | |
|---|---|---|
| JP | 07-003165 | 1/1995 |
| JP | 08-176379 | 7/1996 |

(Continued)

OTHER PUBLICATIONS

Intl Search Report for PCT/US2009/041693, 6 pages.

(Continued)

*Primary Examiner* — Satya Sastri
(74) *Attorney, Agent, or Firm* — Kevin W. Weber (57) ABSTRACT

A gel composition usable as an impact resistant absorbing material, comprises a polymer comprising, as a constituent unit, at least one of an acidic group or a basic group, and 50 weight % or more of an ionic liquid. In addition, a method for preparing the gel composition comprises (a) preparing a mixture liquid comprising a monomer or polymer comprising, as a constituent unit, at least one of an acidic group or a basic group, a cross-linking agent and 50 weight % or more of an ionic liquid, and (b) polymerizing and cross-linking said monomer or cross-linking said polymer in said mixture liquid to form a gel composition.

18 Claims, 1 Drawing Sheet

U.S. PATENT DOCUMENTS

| | | | |
|---|---|---|---|
| 7,833,643 B2* | 11/2010 | Angell et al. | 429/492 |
| 7,955,738 B2* | 6/2011 | Singh et al. | 429/303 |
| 2011/0268950 A1* | 11/2011 | Miyazawa et al. | 428/220 |

FOREIGN PATENT DOCUMENTS

| | | |
|---|---|---|
| JP | 10-052888 | 2/1998 |
| JP | 10-338751 | 12/1998 |
| JP | 11-005875 | 1/1999 |
| JP | 2000-273121 | 10/2000 |
| JP | 2001-151979 | 6/2001 |
| JP | 2003-183441 | 7/2003 |
| JP | 2004-231821 | 8/2004 |
| JP | 2005-179551 | 7/2005 |
| WO | 03-093337 | 11/2003 |
| WO | 2005-030823 | 4/2005 |
| WO | 2006-115255 | 11/2006 |

OTHER PUBLICATIONS

Smith, "Decision of the Commissioner of Patents", Official Journal of Patents, Trade Marks and Designs, 1978, vol. 48, No. 41, pp. 3666-3668.

"Tests for Flammability of Plastic Materials for Parts in Devices and Appliances", Safety Standard UL-94, Oct. 29, 1996, 58 pages.

* cited by examiner

GEL COMPOSITION, METHOD OF PREPARING THE SAME, AND IMPACT RESISTANT ABSORBING MATERIAL USING THE SAME

CROSS REFERENCE TO RELATED APPLICATIONS

This application is a national stage filing under 35 U.S.C. 371 of PCT/US2009/041693, filed Apr. 24, 2009, which claims priority to Japanese Application No 2008-120384, filed May 2, 2008, the disclosure of which is incorporated by reference in its/their entirety herein.

FIELD

The present invention relates to a gel composition, and particularly relates to a gel composition that can be used as an impact resistant absorbing material that contains ionic liquid, to an application thereof, and to a manufacturing method thereof.

BACKGROUND

Impact resistant absorbing materials are widely used in various products that are incorporated into daily life in order to reduce impact to the body in products such as bedding and sporting goods (such as running shoes); in order to eliminate the effects of vibration on the characteristics of equipment for precision equipment and acoustic devices; or in order to prevent damage to products or the like during transportation in the field of packaging materials.

Conventionally, these impact resistant absorbing materials have primarily been made of rubber or polyurethane foam, but in order to achieve greater impact absorbency, the use of gels as impact resistant absorbing materials has been under investigation lately. For example, organogels, which contain oil in a resin, or silicone gels, which contain silicone oil, are known to be gels of this type.

Japanese Unexamined Patent Application 2001-151979 discloses a gel composition with excellent impact absorption characteristics produced by blending mineral oil, castor oil, or cottonseed oil or the like as a softening agent with a triblocked styrene based elastomer and a diblocked styrene based elastomer. Furthermore, Japanese Patent Disclosure H7-3165 discloses a manufacturing method for a porous silicone gel suitable for use as an impact resistant material for sports shoes.

On the other hand, the development of ionic liquids has been proceeding in fields that are entirely different from impact resistant absorbing materials. Ionic liquids are also referred to as ambient temperature molten salts and are liquids at ambient temperature. They are primarily used as electrolytic solutions for various electrochemical devices such as lithium rechargeable batteries and the like because of the high ionic conductivity and non-volatility. Furthermore, the development of gel electrolytes using ionic liquids has also been under investigation recently in order to prevent liquid leaking from the device. Japanese Unexamined Patent Application 2005-179551 discloses a gel electrolyte that is used as an electrolyte for electrochemical devices such as lithium rechargeable batteries and electrochromic display elements and the like.

SUMMARY

The level of impact absorption that is required of the impact resistant absorbing material varies depending on the application, and there has been demand for development of gel compositions that have high impact absorbency. Furthermore, impact resistant absorbing materials are used in various applications, so in addition to the impact absorbency, the addition of added value by providing properties corresponding to the application is also required.

An objective of the present invention is to provide an improved gel composition usable as an impact resistant material, which has an impact absorbing performance and other added values, as well as a method for preparing this gel composition.

The gel composition in one aspect of the present invention provides a gel composition usable as an impact resistant absorbing material, containing a polymer having, as a constituent unit, at least one of an acidic group or a basic group, and 50 weight % or more of an ionic liquid.

Furthermore, the method of preparing the gel composition in another aspect of the present invention provides a method for preparing a gel composition usable as an impact resistant absorbing material, including: preparing a mixture liquid containing a monomer or polymer having, as a constituent unit, at least one of an acidic group or a basic group, a cross-linking agent and 50 weight % or more of an ionic liquid, and polymerizing and cross-linking said monomer or cross-linking said polymer in said mixture liquid to form a gel composition.

Furthermore, the impact resistant absorbing material in another aspect of the present invention provides an impact resistant absorbing material that uses the gel composition of the first aspect of the present invention.

The gel composition of the present invention and the impact resistant absorbing material made using this composition is a gel composition containing large quantities of ionic liquid, and therefore impact is effectively absorbed, and an impact resistant absorbing material can be provided that can demonstrate a practical level of impact absorbency while providing the added values of non-volatility and flame retardancy that are properties provided by the ionic liquid.

The method of preparing the gel composition of the present invention can provide the aforementioned gel composition of the present invention using a simple process.

DETAILED DESCRIPTION

The gel composition of one aspect of an example of the present invention contains an ionic liquid in a polymer structure known as a polymer network, and can be used as an impact resistant absorbing material. Conventional examples of impact resistant absorbing materials that use an ionic liquid or a gel composition as impact resistant absorbing material are not known, and with the present invention, using a gel composition containing an ionic liquid not only provides favorable impact absorbency, but also newly provides added values that were not achievable with a conventional impact resistant absorbing material.

Herein, "gel" refers to a dispersion-based solution with high viscosity that has lost fluidity, and "ionic liquid" refers to a substance that is an electrolyte made from anions and cations and that exists as a liquid at ambient temperature and pressure (25° C., 1 atm. ($1\times10^5$ Pa). Note, "ionic liquids" are also generally referred to as "ambient temperature molten salts".

The ionic liquid that is included in the gel composition of an aspect of the present invention has the ability to effectively provide impact absorption capability while having the properties of an ionic liquid such as non-volatility, flame retardancy, ionic conductivity, and the like. The gel composition of an aspect of the present invention contains a large quantity of ionic liquid, such as 50 weight % or more of the total composition, and the characteristics of flexibility and ionic liquidity are comparatively clearly exhibited.

The polymer that is used in the gel composition of an aspect of the present invention includes at least one constituent unit that is an acidic group or basic group. The acidic group can be for example carboxyl groups, hydroxyl groups, sulfonate groups, and the like. The basic group can be for example primary, secondary, and tertiary amine groups, primary, secondary, tertiary, and quaternary ammonium groups, amido groups, imidazole groups, imido groups, morpholine groups, and piperidyl groups and the like. The polymer that is used in the gel composition of an aspect of the present invention can be a homopolymer, copolymer, or multi-polymer with at least one type of monomer selected from vinyl-based derivatives or salts thereof that contain these acidic groups or basic groups, as well as phenyl resins, epoxy resins, and polysaccharides such as cellulose, starch, and hyaluronic acid, and the like.

Polymers that contain these acidic groups or basic groups can easily form a gel by incorporating the ionic liquid in a polymer matrix by forming interactions such as hydrogen bonds with the ionic liquid when polymerization is performed in the presence of the ionic liquid.

For example, specific examples of monomers which have a carboxyl group as the acidic group include acrylic acid, methacrylic acid, 2-acryloyloxy ethyl phthalate, 2-methacryloyloxyethyl phthalate, 2-acryloyloxyethyl hexahydrophthalate, 2-methacryloyloxyethyl hexahydrophthalate, 2-acryloyloxypropyl acrylate, 2-methacryloyloxypropyl acrylate, ethylene oxide modified succinate acrylate, ethylene oxide modified succinate methacrylate, propylene oxide modified succinate acrylate, and propylene oxide modified succinate methacrylate and the like.

If polyacrylic acid is used as the polymer, the solubility with the ionic liquid will be favorable, and bleed out will not easily occur. Furthermore, interactions such as hydrogen bonds are easily formed with the ionic liquid, and large quantities of ionic liquid are easily incorporated into the polymer matrix. Therefore, a gel composition containing large quantities of ionic liquid components can be provided.

Furthermore, if an acrylic resin, such as an acrylic acid, homopolymer or copolymer are used as the polymer, the gel composition can be made adhesive. In addition, if such an acrylic resin is used, an adhesive layer is not required and the gel composition can be directly applied and used in the required location.

Herein, examples of monomers having a hydroxyl group as the acidic group include 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, 2-hydroxybutyl acrylate, 2-hydroxybutyl methacrylate, epichlorohydrin (ECH) modified phenoxy acrylate, ECH modified phenoxy methacrylate, glycerol acrylate, glycerol methacrylate, ethylene glycol acrylate, ethylene glycol methacrylate, polyethylene glycol acrylate, polyethylene glycol methacrylate, propylene glycol acrylate, propylene glycol methacrylate, polypropylene glycol acrylate, polypropylene glycol methacrylate, 2-hydroxyethyl acrylamide, 2-hydroxypropyl acrylamide, 2-hydroxy butyl acrylamide, vinyl alcohol, acrylonitrile, and the like.

Furthermore, examples of monomers having a sulfonate group as the acidic group include 2-acryloyloxy ethyl sulfonic acid, 2-methacryloxy ethyl sulfonic acid, sodium 2-acryloyloxy ethyl sulfonate, lithium 2-acryloyloxy ethyl sulfonate, ammonium 2-acryloyloxy ethyl sulfonate, imidazolium 2-acryloyloxy ethyl sulfonate, pyridinium 2-acryloyloxy ethyl sulfonate, sodium 2-methacryloxy ethyl sulfonate, lithium 2-methacryloxy ethyl sulfonate, ammonium 2-methacryloxy ethyl sulfonate, imidazolium 2-methacryloxy ethyl sulfonate, pyridinium 2-methacryloxy ethyl sulfonate, styrenesulfonic acid, sodium styrenesulfonate, lithium styrenesulfonate, ammonium styrenesulfonate, imidazolium styrenesulfonate, pyridinium styrenesulfonate and the like.

Furthermore, examples of monomers having a primary, secondary, and or tertiary amine group as the basic group include dimethylaminoethyl acrylate dimethylaminopropyl acrylate, dimethylaminobutyl acrylate, dimethylaminoethyl methacrylate, dimethylaminopropyl methacrylate, dimethylaminobutyl methacrylate, 2-hydroxy-3-dimethylaminopropyl acrylate, 2-hydroxy-3-dimethylaminopropyl methacrylate, diethylaminoethyl acrylate, diethylaminopropyl acrylate, diethylaminobutyl acrylate, diethylaminoethyl methacrylate, diethylaminopropyl methacrylate, diethylaminobutyl methacrylate, 2-hydroxy-3-diethylaminopropyl acrylate, 2-hydroxy-3-diethylaminopropyl methacrylate, dimethylaminoethyl acrylamide, dimethylaminopropyl acrylamide, dimethylaminobutyl acrylamide, diethylaminoethyl acrylamide, diethylaminopropyl acrylamide, diethylaminobutyl acrylamide, and the like.

Furthermore, examples of monomers which have a primary, secondary, tertiary, or quaternary ammonium group as the basic group include acryloyloxyethyldimethyl ammonium fluoride, acryloyloxyethyldimethyl ammonium chloride, acryloyloxyethyldimethyl ammonium bromide, acryloyloxyethyldimethyl ammonium iodide, acryloyloxypropyldimethyl ammonium fluoride, acryloyloxypropyldimethyl ammonium chloride, acryloyloxypropyldimethyl ammonium bromide, acryloyloxypropyldimethyl ammonium iodide, acryloyloxybutyldimethyl ammonium chloride, acryloyloxybutyldimethyl ammonium bromide, acryloyloxybutyldimethyl ammonium iodide, methacryloxyethyldimethyl ammonium fluoride, methacryloxyethyldimethyl ammonium chloride, methacryloxyethyldimethyl ammonium bromide, methacryloxyethyldimethyl ammonium iodide, methacryloxypropyldimethyl ammonium fluoride, methacryloxypropyldimethyl ammonium chloride, methacryloxypropyldimethyl ammonium bromide, methacryloxypropyldimethyl ammonium iodide, methacryloxybutyldimethyl ammonium fluoride, methacryloxybutyldimethyl ammonium chloride, methacryloxybutyldimethyl ammonium bromide, methacryloxybutyldimethyl ammonium iodide, acryloyloxyethyltrimethyl ammonium fluoride, acryloyloxyethyltrimethyl ammonium chloride, acryloyloxyethyltrimethyl ammonium bromide, acryloyloxyethyltrimethyl ammonium iodide, acryloyloxypropyltrimethyl ammonium fluoride, acryloyloxypropyltrimethyl ammonium chloride, acryloyloxypropyltrimethyl ammonium bromide, acryloyloxypropyltrimethyl ammonium iodide, acryloyloxybutyltrimethyl ammonium fluoride, acryloyloxybutyltrimethyl ammonium chloride, acryloyloxybutyltrimethyl ammonium bromide, acryloyloxybutyltrimethyl ammonium iodide, methacryloxyethyltrimethyl ammonium fluoride, methacryloxyethyltrimethyl ammonium chloride, methacryloxyethyltrimethyl ammonium bromide, methacryloxyethyltrimethyl ammonium iodide, methacryloxypropyltrimethyl ammonium fluoride, methacryloxypropyltrimethyl ammonium chloride, methacryloxypropyltrimethyl ammonium bromide, methacryloxypropyltrimethyl ammonium iodide, methacryloxybutyltrimethyl ammonium fluoride, methacryloxybutyltrimethyl ammonium chloride, methacryloxybutyltrimethyl ammonium bromide, methacryloxybutyltrimethyl ammonium iodide, 2-hydroxy-3-acryloyloxypropyldimethyl ammonium fluoride, 2-hydroxy-3-acryloyloxypropyldimethyl ammonium chloride, 2-hydroxy-3-acryloyloxypropyldimethyl ammonium bromide, 2-hydroxy-3-acryloyloxypropyldimethyl ammonium iodide, 2-hydroxy-3-acryloyloxypropyldiethyl ammonium fluoride, 2-hydroxy-3-acryloyloxypropyldiethyl ammonium chloride, 2-hydroxy-3-acryloyloxypropyldiethyl ammonium bromide, 2-hydroxy-3-acryloyloxypropyldiethyl ammonium iodide, 2-hydroxy-3-acryloyloxypropyltrimethyl ammonium fluoride, 2-hydroxy-3-acryloyloxypropyltrimethyl ammonium chloride, 2-hydroxy-3-acryloyloxypropyltrimethyl ammonium bromide, 2-hydroxy-3-acryloyloxypropyltrimethyl ammonium iodide, 2-hydroxy-3-acryloyloxypropyltriethyl ammonium fluoride, 2-hydroxy-3-acryloyloxypropyltriethyl ammonium chloride, 2-hydroxy-3-acryloyloxypropyltriethyl ammonium iodide, 2-hydroxy-3-methacryloxypropyldimethyl ammonium fluoride, 2-hydroxy-3-methacryloxypropyldimethyl ammonium chloride, 2-hydroxy-3-methacryloxypropyldimethyl ammonium bromide, 2-hydroxy-3-methacryloxypropyldimethyl ammonium iodide, 2-hydroxy-3-methacryloxypropyldiethyl ammonium fluoride, 2-hydroxy-3-methacryloxypropyldiethyl ammonium chloride, 2-hydroxy-3-methacryloxypropyldiethyl ammonium bromide, 2-hydroxy-3-methacryloxypropyldiethyl ammonium iodide, 2-hydroxy-3-methacryloxypropyltrimethyl ammonium fluoride, 2-hydroxy-3-methacryloxypropyltrimethyl ammonium chloride, 2-hydroxy-3-methacryloxypropyltrimethyl ammonium bromide, 2-hydroxy-3-methacryloxypropyltrimethyl ammonium iodide, 2-hydroxy-3-methacryloxypropyltriethyl ammonium fluoride, 2-hydroxy-3-methacryloxypropyltriethyl ammonium chloride, 2-hydroxy-3-methacryloxypropyltriethyl ammonium bromide, 2-hydroxy-3-methacryloxypropyltriethyl ammonium iodide and the like.

Furthermore, examples of monomers having amide groups as the basic group include dimethyl acrylamide, dimethyl methacrylamide, diethyl acrylamide, dimethyl methacrylamide, isopropyl acrylamide, isopropyl methacrylamide, and the like.

Examples of monomers having an imidazole group, imide group, formalin group, or piperidyl group as the basic group include vinyl imidazole, imidoacrylate, imidomethacrylate, acryloyl formalin, tetramethyl piperidyl acrylate, tetramethylpiperidyl methacrylate, pentamethylpiperidyl acrylate, pentamethylpiperidyl methacrylate, and the like.

The gel composition of one aspect of the present invention contains an ionic liquid that accounts for 50 weight % or more of the total. By containing large amounts of the ionic liquid in this manner, the gel composition can be made soft, and can be provided with the properties of the ionic liquid such as non-volatility, flame retardancy, and ionic conductivity and the like in addition to the impact absorption capability intrinsic to the gel composition.

Furthermore, with the gel composition of one aspect of the present invention, the ionic liquid contains both ionic bonds between the cations and the anions and hydrogen bonds between the polymer structure and the ionic liquid, so friction will easily be generated due to vibration in the bonded regions, and therefore the impact energy is effectively converted to thermal energy because of the vibration and friction, and a higher impact absorption capacity can be demonstrated as compared to a conventional gel impact resistant absorbing material such as an organogel or the like that contains oil in a polymer without this structure.

Therefore, the impact absorption capability can be expected to increase as the ratio of ionic liquid in the gel composition increases. Therefore, the amount of ionic liquid in the gel composition is preferably 60 weight % or higher, 70 weight % or higher, or even 80 weight % or higher. If the amount is 70 weight % or higher, impact absorption properties comparable to those of a commercial impact resistant absorbing material can be obtained, and if the amount is approximately 80 weight % or higher, the impact absorption properties obtained can be made higher than those of a conventional impact resistant absorbing material that uses urethane rubber, organogel, or silicone rubber.

Furthermore, as the ratio of ionic liquid increases, the impact absorption capability will also increase and the properties of the ionic liquid can be made more pronounced. For example, depending on the type of ionic liquid used, properties inherent to the ionic liquid such as non-volatility, ionic conductivity, flame retardancy, and the like, can be added to the impact absorption capability.

On the other hand, the amount of ionic liquid in the gel composition is preferably an amount that can be supported by the gel composition, and the amount of ionic liquid is preferably 95 weight % or less of the total amount of the gel composition. Furthermore, if the amount is 90 weight % or less, a more stable structure can be obtained, but depending on the application, the amount of ionic liquid in the gel composition can be adjusted to match the required level of impact absorbency.

The type of ionic liquid included in the gel composition of one aspect of the present invention is not restricted. The cations are not particularly restricted, and commonly known cations can also be used. Specifically, primary ($R_1NH_3^+$), secondary ($R_1R_2NH_2^+$), tertiary ($R_1R_2R_3NH^+$), quaternary ($R_1R_2R_3R_4N^+$) chain type ammonium cations (where in the formulas, $R_1$, $R_2$, $R_3$, and R4 are independently straight chain or branched alkyl groups with between 1 and 15 carbon atoms, or are straight or branched alkyl groups with between 1 and 15 carbon atoms having one or more hydroxyl side chains, or a phenyl group) and cyclic ammonium cations can be used. Examples of cyclic ammonium cations include oxazolium, thiazolium, imidazolium, pyrazolium, pyrrolinium, furazanium, triazolium, pyrrolidinium, imidazolidinium, pyrazolidinium, pyrrolinium, imidazolinium, pyrazolinium, pyrazinium, pyrimidinium, pyridazinium, piperidinium, piperazinium, morpholinium, indolium, and carbazolium. Furthermore, examples of other cations include chain-type phosphonium ($R_5R_6R_7P^+$ and $R_5R_6R_7R_8P^+$), chain-type sulfonium cations ($R_9R_{10}R_{11}S^+$) (where in the formulas, $R_5$, $R_6$, $R_7$, $R_8$, $R_9$, $R_{10}$, $R_{11}$ independently represent straight chain or branched alkyl groups or phenyl groups with between 1 and 12 carbon atoms) and cyclic type sulfonium cations. Examples of cyclic sulfonium cations include thiophenium, thiazoinium, and thiopyranium.

The anion can be an ion of an inorganic acid such as phosphoric acid, sulfuric acid, or carbonic acid, or a fluorine-based ion or the like. Various combinations of cations and anions are possible.

Herein, fluorine-based anions include tetrafluoroborate ($BF_4^-$), hexafluorophosphate ($PF_6^-$), hexafluoroarsenate ($AsF_6^-$), trifluoromethylsulfonate ($CF_3SO_3^-$), bis(fluorosulfanyl)imide [$(FSO_2)_2N^-$], bis(trifluoromethylsulfanyl)imide

[(CF$_3$SO$_2$)$_2$N$^-$], bis(trifluoroethylsulfanyl)imide [(CF$_3$CF$_2$SO$_2$)$_2$N$^-$], and tris(trifluoromethylsulfanylmethide) [(CF$_3$SO$_2$)$_3$C$^-$].

However, the use of non-halogen-based anions is preferable, and in particular, if phosphate ions are used, costs will be lower and economics will be improved thereby, and high flame retardancy can be obtained compared to using fluorine-based ions. For example, salts containing phosphate groups expressed by the general formulas [PO$_4^{3-}$], [RPO$_4^{2-}$], or [RR'PO$_4^-$] (where R and R' represent straight chain or branched alkyl groups with between 1 and 8 carbon atoms or phenyl groups) can be used as phosphate based anions. Specific examples include phosphoric acids (PO$_4^{3-}$, HPO$_4^{2-}$, H$_2$PO$_4^-$), phosphate monoesters (RPO$_4^{2-}$, HRPO$_4^-$), and phosphate diesters (R$_2$PO$_4^-$) [where R is a straight chain or branched alkyl group with between 1 and 8 carbon atoms or phenyl group].

As described above, the gel composition of this aspect of the present embodiment can provide flame retardancy if a flame retardant ionic liquid is used. Herein, flame retardancy herein refers to a level corresponding to V-1 or higher, more preferably V-0 or higher according to the flame retardancy test method of Safety Standard UL-94 designated by, for example, US-based Underwriters Laboratories Inc. (UL), as well as to the property of extinguishing flames within a range between several seconds and several dozen seconds when removed from a burner after being in contact with a flame such as a burner for a fixed period of time as shown in the flame retardancy test examples of the following embodiments or self extinguishing properties according to method A as designated by JISK6911.

The impact absorbency of the gel composition of this aspect of the present embodiment can be evaluated by measuring the surface hardness and by using a drop test and the like. For example, the surface hardness test can be performed by measuring the Asker hardness defined by SRIS0101 (Society of Rubber Industry, Japan Standard Specification) measured using a Durometer (spring type hardness meter) manufactured by Asker Company. For example, "Asker C hardness" is defined as a relative surface hardness using the hardness of a 55 g spring load as 0 and the hardness of a 455 g spring load as 100, using a probe with a 5.08 mm diameter semi-spherical shape. Note, soft materials where the hardness is difficult to express using Asker C hardness can use "Asker F hardness".

The gel composition of this aspect of the present embodiment tends to have a higher impact absorption effect if the surface hardness is softer, and for example, with a gel composition formed as a 10 mm thick sheet with an Asker C hardness of 75° or less, impact absorbency can be obtained that is at least equal to a conventional impact resistant absorbing material that uses urethane rubber, organogel, or silicone gel. Furthermore, if the Asker C hardness is 10° or less, a higher impact absorbency can be obtained.

When measuring the impact absorbency of the gel composition using a drop test, the measurement can be performed using the following conditions for example. In other words, a weight with a set shape and weight is dropped naturally onto a plate from a fixed distance, and the acceleration (A0) of the vibration generated on the plate due to the impact shock is measured. Next, the gel composition is attached to the plate, and similarly the weight is dropped and the acceleration (Am) of the vibration generated on the plate due to the impact shock is measured. The impact absorbency can be evaluated by the ratio of the two accelerations (Am/A0). The specific measurement conditions are described in the embodiments. Note, measurement of the impact absorbency is not restricted to the aforementioned method.

Next, the method of manufacturing the gel composition of one aspect of the present embodiment is described. The gel composition of this aspect can be manufactured by blending and ionic liquid, (monomer or polymer), and a cross-linking agent if necessary, and the monomer can be polymerized and crosslinked by means of irradiation with UV light or by heating the monomer, or the polymer can be crosslinked thereby.

The ionic liquid may be a commercial product, but can also be synthesized using a method such as an acid ester method, a complex formation method, a neutralization method or the like. Furthermore, a plurality of types can be blended together and used instead of a single type.

For example, when synthesizing a phosphate-based ionic liquid using a neutralization method, an amine is added by drops to an inorganic/organic phosphoric acid such as phosphoric acid or dibutyl phosphate or the like, which is diluted 5:1 using an organic solvent such as alcohol, under low-temperature conditions such as at 0° C., and then sufficiently mixing it at room temperature. Next, this solution is distilled under reduced pressure to evaporate off the solvent.

Next, if necessary, the ionic liquid obtained is blended with one or more types of monomers and a cross-linking agent. The monomer is a monomer that includes as constituent units at least one acidic group selected from the group consisting of carboxyl groups, hydroxyl groups, and sulfonate groups and the like, or a monomer that includes as constituent units at least one basic group selected from the group consisting of primary, secondary, and tertiary amine groups, primary, secondary, tertiary, and quaternary ammonium groups, amide groups, imidazole groups, imide groups, formalin groups, and piperidyl groups and the like. The monomer is not restricted to a single type, and two or more types can also be used.

For example, if an acrylic acid monomer that is a monomer that contains a carboxyl group is used, a monomer such as acrylic acid, ammonium acrylate, sodium acrylate, lithium acrylate, methacrylic acid, ammonium methacrylate, sodium methacrylate, lithium methacrylate, and the like can be used.

The blending ratio of ionic liquid to monomer is 100 mass parts or more of ionic liquid to 100 mass parts of monomer such that, for example, 50 weight % or more of the final gel composition obtained is ionic liquid.

A polymer can be used instead of the monomer. Furthermore, both monomers and polymers can be used, or a plurality of types of monomers and polymers can be used. In either case, 100 mass parts or more of ionic liquid are added to a total of 100 mass parts of monomer and polymer.

Between approximately 0.1 mass parts and 10 mass parts, or between 0.1 and 50 mass parts of cross-linking agent are added to 100 mass parts of the monomer, or the polymer, or to 100 mass parts of total monomer and polymer.

Furthermore, if the acrylic acid monomer is used, the cross-linking agent can be for example 1,6-hexanediol diacrylate 1,6-hexanediol dimethacrylate, ECH modified 1,6-hexane diol diacrylate, ECH modified 1,6-hexane diol dimethacrylate, 1,9-nonanediol diacrylate, 1,9-nonanediol dimethacrylate, ethylene glycol diacrylate, ethylene glycol dimethacrylate, polyethylene glycol diacrylate, polyethylene glycol dimethacrylate, propylene glycol diacrylate, propylene glycol dimethacrylate, polypropylene glycol diacrylate, polypropylene glycol dimethacrylate, ethylene oxide (EO) modified bisphenol A diacrylate, EO modified bisphenol A dimethacrylate, polypropylene oxide (PO) modified bisphenol A diacrylate, PO modified bisphenol A dimethacrylate, EO modified neopentyl glycol diacrylate, EO modified neopentyl glycol dimethacrylate, EO modified glycerol triacrylate, epichlorohydrin (ECH) modified diacrylate, ECH modified dimethacrylate, ECH modified ethylene glycol diacrylate, ECH modified ethylene glycol dimethacrylate, ECH modified polypropylene glycol diacrylate, ECH modified propylene glycol dimethacrylate, ECH modified phthalate diacrylate, PO modified glycerol triacrylate, ECH modified glycerol triacrylate, EO modified glycerol trimethacrylate, PO modified glycerol trimethacrylate, ECH modified glycerol trimethacrylate, EO modified trimethylol propane triacrylate, PO modified trimethylol propane triacrylate, 1,6-hexanediol diglycidyl ether, hydrogenated bisphenol A diglycidyl ether, neopentyl glycol diglycidyl ether, glycerol polyglycidyl ether, diglycerol polyglycidyl ether, polyglycerol polyglycidyl ether, trimethylol propane polyglycidyl ether, pentaerythritol polyglycidyl ether, sorbitol polyglycidyl ether, diglycidyl terephthalate, diglycidyl phthalate, ethylene glycol diglycidyl ether, polyethylene glycol diglycidyl ether, propylene glycol diglycidyl ether, polypropylene glycol diglycidyl ether, and the like.

The polymerization method can be by either heat or radiation. If ultraviolet light (UV) with a wavelength between 200 nm and 400 nm is used as the radiation, polymer hardening can occur at room temperature, so the gel composition can be directly formed even on substrates with a relatively low melting point. Note, if UV polymerization is performed, a polymerization initiator is added. The amount of polymerization initiator that is added is between 0.01 mass parts and 1 mass parts per 100 mass parts of monomer.

Examples of the polymerization initiator include 1-[4-(2-hydroxyethoxy)phenyl]-2-hydroxy-2-methyl-1-propane-1-one (Irgacure™ 2959, Ciba Specialty Chemicals), 1-hydroxycyclohexyl phenyl ketone (Irgacure™ 184, Ciba Specialty Chemicals), 2,2-trimethyl benzoyl diphenyl phosphine oxide (Irgacure™ 651, Ciba Specialty Chemicals), 2,4,6-trimethyl benzoyl diphenyl phosphine oxide (Lucirin™ TPO, BASF), 2,4,6-trimethyl benzoyl phenyl ethoxy phosphine oxide (Lucirin™ TPO-L, BASF), 2-benzyl-2-trimethyl amino-1-(4-morpholinophenyl)butane-1-one (Irgacure™ 369, Ciba Specialty Chemicals), 2-hydroxy-2-methyl-1-phenyl-propane-1-one (Darcure™ 1173, Ciba Specialty Chemicals), 2-methyl-1-[(4-methylthio)phenyl]-2-morpholinopropane-1-one (Irgacure™ 907, Ciba Specialty Chemicals), bis (2,4,6-trimethylbenzoyl)-phenylphosphine oxide (Irgacure™ 819, Ciba Specialty Chemicals) and the like.

Note, various additives can also be added to match the application for the impact resistant absorbing material. For example, a filler can also be added as a heat dissipating material or an electromagnetic wave absorbing material. If the gel composition is essentially transparent, the composition can be colored by adding a pigment or colorant. Furthermore, if necessary, a cohesion enhancing agent, surface wetting agent, leveling agent, antioxidant, preservative, and the like can also be added.

Furthermore, during polymerization, required processing can be performed in order to match the application. The shape is not particularly restricted. For example, the material can be in a sheet with a thickness between several millimeters and several dozen millimeters, or can be a film with a thickness fewer than several millimeters. Alternatively, if the material is used by overlaying onto a member, a material can be formed to match the shape of the member that will be overlaid.

If the material is processed as a sheet or film, a solution blend containing the aforementioned ionic liquid, monomer, cross-linking agent, and photoinitiator can be poured into a mold frame with good release properties such as silicone rubber and the like, and then a peeled transparent resin film can be laminated thereon. Next, ultraviolet light (UV) is a radiated through the transparent resin film to polymerize the blended solution. After polymerization, a gel composition in the form of a sheet can be obtained by peeling the mold frame and resin film.

Note, the blended solution can also be coated onto the peeled resin film, and then laminated with a peeled resin film so as to be sandwiched between the resin films, and then the blended solution can be polymerized by irradiating it with ultraviolet light (UV). After polymerization a gel composition in the form of a film can be obtained by peeling off both films. Alternatively, the gel composition can be used as an impact resistant absorbing material by remaining sandwiched between the two resin films. Furthermore, the edges of the two resin films may be sealed in order to make a construction with a sealed gel composition.

It is also possible to peel off only one of the two resin films, and at the time of use by the user, the other film is peeled off and the gel composition surface on the peeled side is applied to the location where the impact resistant absorbing material is to be used. If an acrylic acid homopolymer or copolymer is used as the polymer of the gel composition, the gel composition itself will have adhesive strength, and can be used by direct application to the required location. The resin film used is not particularly restricted, but is preferably a film with flexibility. Examples include resin films made of polyethylene, polypropylene, vinyl chloride, polycarbonate, thermoplastic polyurethane, cellophane (registered trademark), vinylidene fluoride, polyethylene terephthalate (PET), polystyrene and vinylidene chloride acrylic, polyurethane, polyolefin, fluorine-based resins (PVdF, ETFE, and the like), polyimide, phenol resin, epoxy resin, polyamide, polyphenylene ether, and the like.

Specific applications where the gel composition of this aspect of the present embodiment is used as an impact resistant absorbing material include shoe bottoms and liners for various types of shoes including running shoes, walking shoes, and other sports shoes and the like. Shoes using these impact resistant absorbing materials can reduce the impact on the body when worn. Furthermore, when used as the soles of work shoes in a factory, the conductivity of the ionic solution can demonstrate a static electricity eliminating effect.

Furthermore, the material can also be used on sporting-goods such as grips for tennis rackets, baseball bats, and golf clubs and the like. Thereby the shock on the body (particularly on the hands and arms) generated during impact can be relieved.

Furthermore, use of the material in care-giving products such as mats for care-giving beds will have the effect of preventing bedsores.

The material can also be used as an impact resistant absorbing material for automotive members such as the areas around the engine, inside vehicle walls, seats, and child seats, as well as construction members, railroad members, guardrail corners, and helmets. Furthermore a flame retardant impact resistant absorbing material can be provided. By installing this material under or around washing machines, refrigerators, audio equipment, and various motors, vibration can be suppressed and noise countermeasures can be provided.

In the electronic and electrical devices, the material can be used as a member that is applied to a position on the inner or outer wall of the housing, or as a packaging material for precision equipment, but in this case, the material can provide not only impact adsorption, but the conductivity of the ionic liquid can also provide antistatic electricity effects. Furthermore, when used as an automotive member around the engine or as a construction member, the gel composition can provide the effects of an impact absorbing member and the flame retardancy of the ionic liquid can act as a fire extinguisher. Furthermore, the ionic liquid is non-volatile, so stable properties can be achieved across a wide temperature range.

In this manner, if a gel composition that contains an ionic liquid is used as an impact resistant absorbing material, the flame retardancy, non-volatility, and static electricity eliminating effects of the ionic liquid can provide added value that was not obtainable using a silicone gel or organogel that contains oil in a conventional resin, in addition to the impact absorbency.

EXAMPLES

The present invention is described below while referring to embodiments, but the scope of the present invention is not restricted to the contents of the embodiments.

I. Method of Synthesizing Ionic Liquid

The gel composition of the present embodiment was produced by synthesizing three types of ionic liquids under the following conditions, and then manufacturing the gel composition using the preparation methods described below.

1. Molar blend of monoethyl/diethyl phosphoric acid and triethyl ammonium (TrEA-EtHPO$_4$/Et$_2$PO$_4$):

50 mass parts of methanol (MeOH) (special grade, manufactured by Wako Pure Chemicals Industries, Ltd.) was added to 100 mass parts of triethylamine (TrEA) (manufactured by Daicel Chemical Industries, Ltd.), and then 139 mass parts of a solution of monoethyl phosphate and diethyl phosphate with a molar ratio of 50:50 (EtH$_2$PO$_4$/Et$_2$HPO$_4$) (JP-502, manufactured by Johoku Chemical Co., Ltd.) was slowly added by dripping while cooling with ice. After mixing for 3 hours at room temperature, the solution was distilled under reduced pressure to obtain TrEA-EtHPO$_4$/Et$_2$PO$_4$, a colorless clear viscous liquid.

2. Molar blend of monoethyl/diethyl phosphoric acid and ethyl morpholinium (EM-EtHPO$_4$/Et$_2$PO$_4$):

50 mass parts of MeOH was added to 100 mass parts of ethyl morpholine (EM) (primary grade, manufactured by Wako Pure Chemical Industries, Ltd.), and then 122 mass parts of a solution of monoethyl phosphate and diethyl phosphate with a molar ratio of 50:50 (EtH$_2$PO$_4$/Et$_2$HPO$_4$) was slowly added by dripping while cooling with ice. After mixing for 3 hours at room temperature, the solution was distilled under reduced pressure to obtain EM-EtHPO$_4$/Et$_2$PO$_4$, a brown viscous liquid.

3. Dibutyl phosphoric acid and ethyl morpholinium (EM-Bu$_2$PO$_4$):

50 mass parts of MeOH was added to 100 mass parts of EM, and then 183 mass parts of dibutyl phosphate (HBu$_2$PO$_4$) (manufactured by Sigma-Aldrich Japan K.K.) was slowly added by dripping while cooling with ice. After mixing for 3 hours at room temperature, the solution was distilled under reduced pressure to obtain EM-Bu$_2$PO$_4$, a brown viscous liquid.

II. Conditions for Preparing the Gel Composition of Each Embodiment

Embodiments 1, 2, 9, 10

TrEA-EtHPO$_4$/Et$_2$PO$_4$ was used as the ionic liquid, and acrylic acid with a carboxyl group (COOH group) (AA) (special grade, manufactured by Wako Pure Chemical Industries, Ltd.) was used as the unsaturated monomer. Polyethylene glycol diacrylate (NK Ester A-600, manufactured by Shin-Nakamura Chemical Industries, Ltd.), a cross-linking agent, and 2-hydroxy-2-methyl-1-phenyl-propane-1-one, a photo-initiator (Darcure™ 1173, manufactured by Ciba Specialty Chemicals) were added to the ionic liquid and unsaturated monomer to prepare a UV hardening monomer solution. The blending ratio of each composition is shown in Table 1. After removing the air with vacuum, the compositions were poured into a silicone rubber mold frame and then laminated with peeled PET film with a thickness of 50 μm. This film was then irradiated with ultraviolet light at 45,000 mJ/cm$^2$ from the PET film side to polymerize and harden the composition. After hardening, a sheet like gel composition was obtained by peeling from the mold frame. Note, gel compositions with three different thicknesses, 3 mm, 10 mm, and 13 mm, were prepared to match the evaluation conditions.

Embodiment 3 and 4

EM-EtHPO$_4$/Et$_2$PO$_4$ was used as the ionic liquid. A gel composition was obtained with all other conditions being the same as embodiment 1. The blending ratio of each composition is shown in Table 1.

Embodiment 5 and 6

EM-Bu$_2$PO$_4$ was used as the ionic liquid. A gel composition was obtained with all other conditions being the same as embodiment 1. The blending ratio of each composition is shown in Table 1.

| | | Composition | | | | | Evaluation | | | | |
|---|---|---|---|---|---|---|---|---|---|---|---|
| | | | Monomer | | Cross-linking | Photo-ini- | Flame retard- | Hardness (°) | | Impact absorbency [—] | | |
| | Ionic liquid | | AA | HEA | agent*[1] | tiator*[2] | ancy? | | | Dropped from 10 cm | Dropped from 60 cm | Appearance |
| | Type | Mass % | Mass % | Mass % | Mass % | Mass % | Y/N | Asker C | Asker F | | | |
| Embodiment 1 | TrEA-EtHPO$_4$/Et$_2$PO$_4$ | 80 | 20 | — | 0.08 | 0.08 | Y | 5 | 75 | 0.14 | 0.45 | Transparent colorless |
| Embodiment 2 | TrEA-EtHPO$_4$/Et$_2$PO$_4$ | 88 | 10 | — | 1.95 | 0.08 | Y | 0 | 55 | 0.14 | 0.55 | Transparent colorless |
| Embodiment 3 | EM-EtHPO$_4$/Et$_2$PO$_4$ | 80 | 20 | — | 0.06 | 0.04 | Y | 35 | — | 0.25 | 0.58 | Transparent pale yellow color |
| Embodiment 4 | EM-EtHPO$_4$/Et$_2$PO$_4$ | 86 | 10 | — | 3.84 | 0.08 | Y | 0 | 29 | 0.18 | 0.41 | Transparent pale yellow color |

-continued

| | Composition | | | | | Evaluation | | | | | |
|---|---|---|---|---|---|---|---|---|---|---|---|
| | Ionic liquid | | Monomer | | Cross-linking agent[1] | Photo-initiator[2] | Flame retardancy? | Hardness (°) | | Impact absorbency [−] | |
| | | | AA | HEA | | | | | | Dropped from 10 cm | Dropped from 60 cm | |
| | Type | Mass % | Mass % | Mass % | Mass % | Mass % | Y/N | Asker C | Asker F | | | Appearance |
| Embodiment 5 | EM-Bu$_2$PO$_4$ | 80 | 20 | — | 0.08 | 0.04 | Y | 30 | — | 0.22 | 0.54 | Transparent pale yellow color |
| Embodiment 6 | EM-Bu$_2$PO$_4$ | 87 | 10 | — | 3.84 | 0.04 | Y | 0 | 37 | 0.14 | 0.37 | Transparent pale yellow color |
| Embodiment 7 | TrEA-EtHPO$_4$/Et$_2$PO$_4$ | 80 | — | 20 | 0.08 | 0.04 | Y | 0 | 46 | 0.05 | 0.34 | Transparent colorless |
| Embodiment 8 | TrEA-EtHPO$_4$/Et$_2$PO$_4$ | 90 | — | 10 | 3.84 | 0.08 | Y | 0 | 32 | 0.22 | 0.44 | Transparent colorless |
| Embodiment 9 | TrEA-EtHPO$_4$/Et$_2$PO$_4$ | 60 | 40 | — | 0.16 | 0.16 | Y | 75 | — | 0.55 | 0.68 | Transparent colorless |
| Embodiment 10 | TrEA-EtHPO$_4$/Et$_2$PO$_4$ | 70 | 30 | — | 0.12 | 0.12 | Y | 35 | — | 0.14 | 0.70 | Transparent colorless |
| Comparative Example 1 | [3] | | | | | | N | 10 | — | 0.26 | 0.66 | Nontransparent blue |
| Comparative Example 2 | [4] | | | | | | N | 55 | — | — | 0.74 | Nontransparent blackish blue |
| Comparative Example 3 | [5] | | | | | | Y | 12 | — | 0.12 | 0.80 | Nontransparent colorless |

[1] polyethylene glycol diacrylate
[2] 2-hydroxy-2-methyl-1-phenyl-propane-1-one
[3] polyurethane
[4] organogel
[5] silicone gel Embodiment 7 and 8

2-hydroxyethyl acrylate (HEA) which has a hydroxyl group (primary grade, manufactured by Wako Pure Chemical Industries, Ltd.) was used as the unsaturated monomer. A gel composition was obtained with all other conditions being the same as embodiment 1. The blending ratio of each composition is shown in Table 1.

III. Comparative Examples

Commercial products and products manufactured to correspond to a conventional impact resistant absorbing material that did not use an ionic liquid were used as comparative examples 1 through 3. The conditions of each of the comparative examples are shown below.

Comparative Example 1

Comparative example 1 was a commercial impact resistant absorbing material (tradename: Sorbothane (registered trademark), manufactured by Sorbothane), a thermal hardening polyether-based polyurethane.

Comparative Example 2

Comparative example 2 was a conventional organogel, manufactured under the following conditions.

100 mass parts of styrene-vinyl isoprene-styrene copolymer (product name: Hybrar 5127 (manufactured by Kuraray Co., Ltd.) and 60 mass parts of liquid polybutene (product name: GLISSOPAL V1500 (manufactured by BASF) were dissolved in 291 mass parts of toluene, and then 50 mass parts of calcium carbonate (special grade, manufactured by Wako Pure Chemical Industries, Ltd.), 10 mass parts of carbon black (product name: #3030 (manufactured by Mitsubishi Chemical Corporation)), 1 mass part of stearic acid (special grade, manufactured by Wako Pure Chemical Industries, Ltd.), and 0.5 mass parts of Perbutyl P (manufactured by NOF Corporation) were added. The solution was applied using a knife coater to a peeled PET film, and then dried at 120° C. for 20 minutes to obtain a film with a thickness of 100 μm. The coating process was repeated until 37 layers were formed, and then the film was cross-linked by heat pressing at 170° C. for 20 minutes in order to obtain an organogel with a thickness of approximately 3 mm.

Comparative Example 3

Comparative example 3 is a commercial silicone gel made by a padding approximately 30 mass % polydimethylsiloxane to a silicone rubber silicone gel, marketed under the product name Alpha Gel™ and manufactured by Geltek.

IV. Evaluation of Gel Composition

The gel compositions of each of the embodiments and comparative examples were evaluated using the following measurement methods.

Impact Absorbency Measurement

Figure 1:
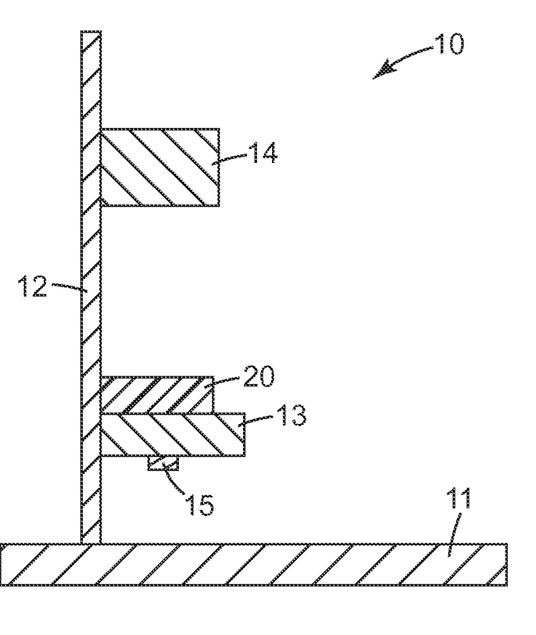
FIG. 1 is a schematic cross-section view showing the construction of a measuring apparatus that was used for measuring the impact absorbency of the gel composition of the embodiments of the present invention.

FIG. 1 shows a schematic cross-section view of the structure of an impact absorbency measuring apparatus 10. The measuring apparatus 10 has a base 11 with a horizontal surface, a rail 12 that extends in a perpendicular direction to the base, and a 10 mm thick metal plate 13 fixed to the rail 12 to the essentially parallel to the horizontal surface of the base 11. An acceleration detector 15 is provided on the back surface of the plate 13, and a iron plate 14 is attached such that it can move smoothly up and down along the rail 12 above the plate 13. The size of the iron plate 14 is 40 mm×5 mm×80 mm (width×depth×height), and the weight is 200 g. The 3 mm thick gel composition sheet 20 manufactured according to each embodiment was cut to a size of 40 mm×5 mm to have essentially the same surface area as a iron plate 14, and then placed on the plate 13 and the iron plate 14 was dropped along the rail from a height of 60 cm and 10 cm. The setup was adjusted so that the shock resulting from dropping the iron plate 14 is uniformly received essentially across the entire surface 40 mm×5 mm of the gel composition. The acceleration (Am) generated on the plate 13 by the shock of dropping it was measured using the acceleration detector 15 located on the back surface of the plate 13. The iron plate 14 dropping test was performed in similar manner without placing the gel composition 20 on the plate 13, and the acceleration (A0) of the plate 13 was measured. The impact absorbency of the gel composition was evaluated by comparing the acceleration values (Am/A0).

Gel Composition Hardness Measurement

The "Asker C hardness", "Asker F hardness", or "Asker A hardness" was measured for the 10 mm thick gel composition sheets. "Asker C hardness" or "Asker F hardness" refers to the hardness measured using an Asker C hardness meter or an Asker F hardness meter, which are Durometers (spring type hardness meter) specified in The Society of Rubber Industry, Japan standard specification SRIS0101. The Asker F hardness is measured for gel compositions that are too soft to be measured by an Asker C hardness meter, and the Asker A hardness is measured for gel compositions which are too hard to be measured by an Asker C hardness meter. The "Asker A hardness" refers to the hardness measured using a Type A durometer in conformance with JIS K 6253.

Gel Composition Flame Retardancy Test

A 50 mm long blue burner flame without a yellow tip was brought into contact with a round plate gel composition with a diameter of 25 mm and a thickness of 3 mm for 30 seconds. The condition of the gel composition immediately after removing the flame was visually confirmed. If the flame died immediately (at least within several seconds) without burning, an evaluation of "flame retardant" was made, and if the burning continued, an evaluation of "not flame retardant" was made.

Observation of Appearance

The transparency and color of the gel composition were visually confirmed.

V. Results

The evaluation results and the manufacturing conditions (ionic liquid type, composition ratio) of the gel compositions of each of the embodiments 1 through 10 are shown in Table 1. Furthermore, the results of the performance evaluations under the same conditions for the comparative examples 1 through 3 are also shown in Table 1.

I claim:

1. A gel composition usable as an impact resistant absorbing material, comprising a polymer comprising, as a constituent unit, at least one of an acidic group or a basic group, and 50 weight % or more of an ionic liquid, wherein said ionic liquid comprises at least one phosphate based anion.

2. The gel composition according to claim 1, wherein said polymer comprises, as a constituent unit, a carboxylic group, a sulfonic group or a hydroxylic group as said acidic group.

3. The gel composition according to claim 1, wherein said polymer is an acrylic acid homopolymer or copolymer.

4. The gel composition according to claim 1, wherein said ionic liquid is a non-halogenated ionic liquid.

5. The gel composition according to claim 1, wherein the at least one phosphate based anion is selected from the group consisting of phosphoric acid anion and phosphoric acid ester anion.

6. The gel composition according to claim 1, wherein it has ASKER C hardness of 75° or lower at a surface of a sheet article having a thickness of 10 mm.

7. The gel composition according to claim 1, wherein it is flame retardant.

8. A method for preparing a gel composition usable as an impact resistant absorbing material, comprising:
   preparing a mixture liquid comprising a monomer or polymer comprising, as a constituent unit, at least one of an acidic group or a basic group; a cross-linking agent; and 50 weight % or more of an ionic liquid, wherein said ionic liquid comprises at least one phosphate based anion, and
   polymerizing and cross-linking said monomer or cross-linking said polymer in said mixture liquid to form a gel composition.

9. The method for preparing a gel composition according to claim 8, wherein the monomer or polymer comprises a carboxylic group, a sulfonic group or a hydroxylic group as said acidic group.

10. The method for preparing a gel composition according to claim 8, wherein acrylic acid is used as said monomer.

11. The method for preparing a gel composition according to claim 8, wherein the at least one phosphate based anion is selected from the group consisting of phosphoric acid anion and phosphoric ester anion.

12. The method for preparing a gel composition according to claim 8, wherein the composition is formed into a sheet or film in forming the gel composition.

13. The method for preparing a gel composition according to claim 8, wherein the gel composition is molded into a shape for use as an impact resistant absorbing material in forming the gel composition.

14. An impact resistant absorbing material using the gel composition according to claim 1.

15. An impact resistant absorbing material, wherein the gel composition according to claim 1 is formed into a sheet or film.

16. An impact resistant absorbing material, comprising at least one flexible plastic sheet and the gel composition according to claim 1 on said plastic sheet.

17. The gel composition according to claim 1, comprising at least 70 weight % of the ionic liquid and no greater than 95 weight % of the ionic liquid.

18. The gel composition according to claim 17, and comprising 80 weight % or more of the ionic liquid.

* * * * *